US010232273B2

(12) United States Patent
Bangdiwala et al.

(10) Patent No.: US 10,232,273 B2
(45) Date of Patent: Mar. 19, 2019

(54) USER-PAIRING EVALUATION METHOD AND APPARATUS

(71) Applicant: Sony Interactive Entertainment Inc., Tokyo (JP)

(72) Inventors: Rohan Pankaj Bangdiwala, London (GB); Jake Leigh Clarke, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 8 days.

(21) Appl. No.: 15/373,569

(22) Filed: Dec. 9, 2016

(65) Prior Publication Data
US 2017/0173474 A1 Jun. 22, 2017

(30) Foreign Application Priority Data
Dec. 18, 2015 (GB) .................................. 1522400.9

(51) Int. Cl.
*A63F 13/795* (2014.01)
*A63F 13/35* (2014.01)

(52) U.S. Cl.
CPC ............ *A63F 13/795* (2014.09); *A63F 13/35* (2014.09); *A63F 2300/5566* (2013.01)

(58) Field of Classification Search
USPC .......................................................... 463/42
See application file for complete search history.

(56) References Cited

U.S. PATENT DOCUMENTS

| 2002/0183961 A1* | 12/2002 | French .............. A63B 24/0003 73/379.04 |
| 2007/0066403 A1* | 3/2007 | Conkwright ............ A63F 13/10 463/43 |
| 2010/0302142 A1* | 12/2010 | French .............. A63B 24/0003 345/156 |
| 2010/0306672 A1 | 12/2010 | McEniry |
| 2011/0252144 A1 | 10/2011 | Tung |
| 2014/0004960 A1 | 1/2014 | Soti |
| 2015/0066956 A1 | 3/2015 | Chae |

FOREIGN PATENT DOCUMENTS

| WO | 2008034145 A1 | 3/2008 |
| WO | 2012174656 A1 | 12/2012 |
| WO | 2015055014 A1 | 4/2015 |

OTHER PUBLICATIONS

Search Report for corresponding GB application No. 1522400.9, 7 pages, dated Mar. 23, 2016.
EPO Examination Report for corresponding EP application No. GB1522400.9, 3 pages, dated Oct. 17, 2018.

* cited by examiner

*Primary Examiner* — Pierre E Elisca
(74) *Attorney, Agent, or Firm* — Matthew B. Dernier, Esq.

(57) ABSTRACT

A method of evaluating a pairing between a first player and a second player of a multiplayer application comprises the steps of obtaining one or more parameter values for each of the first player and the second player, inputting the parameter values for each of the first player and the second player into an artificial neural network, obtaining at least a first pairing fitness value output from the artificial neural network, and selecting to pair the first player and the second player in dependence upon a criterion responsive to the each pairing fitness value.

12 Claims, 2 Drawing Sheets

USER-PAIRING EVALUATION METHOD AND APPARATUS

BACKGROUND OF THE INVENTION

Field of the Invention

The present invention relates to a user-pairing evaluation method and apparatus.

Description of the Prior Art

Modern on-line multi-user applications such as multi-player videogames often attempt to provide a positive experience for their users by selecting either on-line hosts or on-line opponents according to predetermined criteria such as connection speed between player and host, or relative in-game ranking or progression between players.

However, these are relatively crude bases for pairing users together, and may not be adequate for games that benefit from complementary playing styles (such as cooperative multiplayer games) or in which player-player interactions are relatively complex (such as massively multiplayer on-line games).

Consequently an improved means of pairing users within such on-line multi-user applications is desirable.

The present invention seeks to mitigate or alleviate this need.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY OF THE INVENTION

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
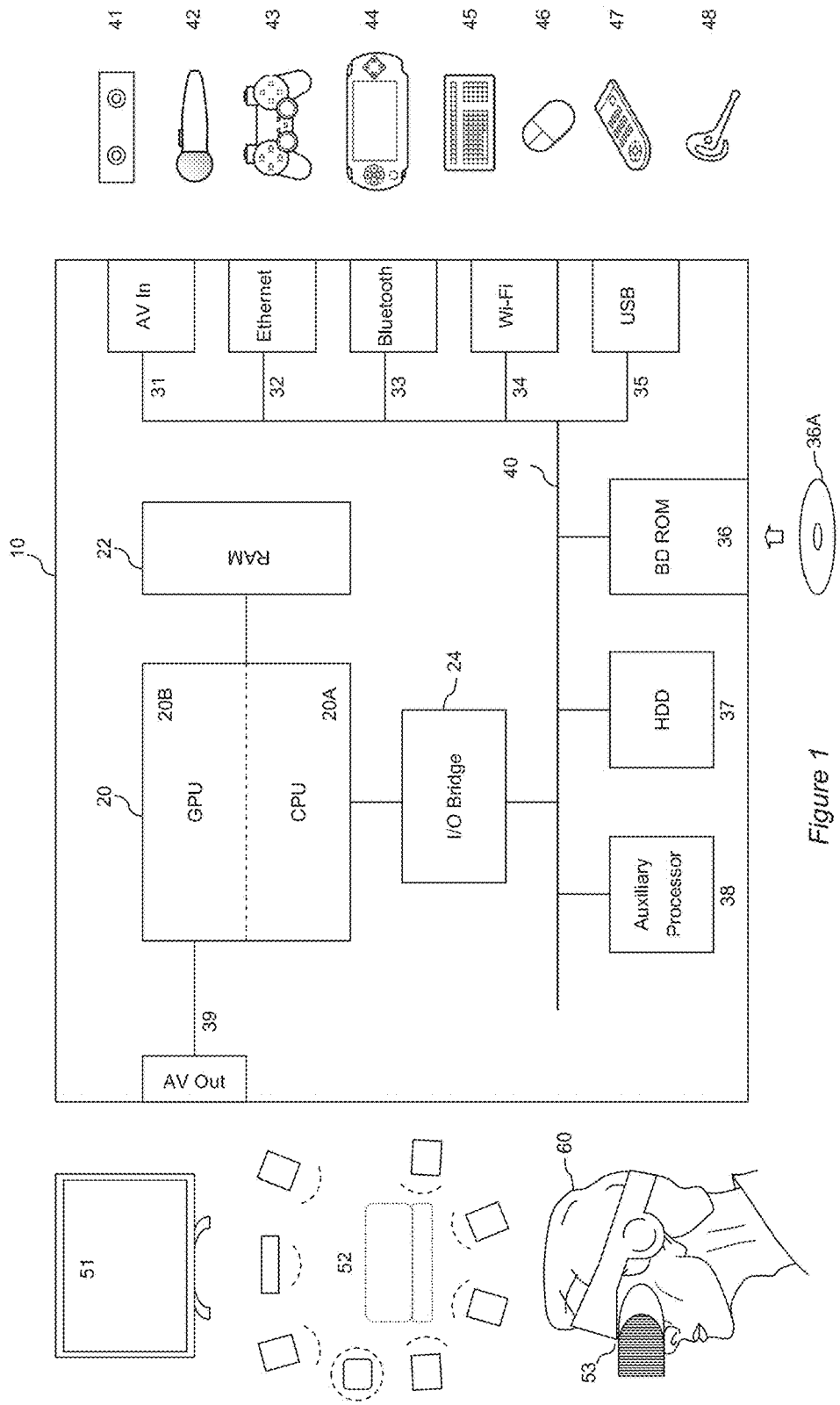
FIG. 1 is a schematic diagram of an entertainment device in accordance with embodiments of the present invention.

Referring now to the drawings, wherein like reference numerals designate identical or corresponding parts throughout the several views, a user-pairing evaluation method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

As noted previously a typical example of an on-line multi-user application is a multiplayer videogame, which may be played on an entertainment device such as the Sony® PlayStation 4®.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B.

The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

In the following description, for convenience the multiplayer application is referred to as a multiplayer game or simply a game; however it will be appreciated that the multiplayer application is not limited to games such, and may for example be a non-game application such as a collaborative music composing or playing application (for example, an on-line musical 'jamming' session).

In an embodiment of the present invention, an entertainment device of a first player obtains one or more parameter values for the first player and a candidate second player to be paired with the first player. The parameter value(s) for the first player may be stored in memory on the entertainment device or may be obtained from a central server, for example a server that administers the multiplayer game. The parameter value(s) for the second player may be received from the central server or from a peer device of the second player via a network port (for example Ethernet® port 32 or Wi-Fi® wireless link 34).

The or each parameter may be characteristic of the user and/or their gameplay. Parameters characteristic of the user but typically independent of the specific game include but are not limited to: the user's language, country, and on-line connection quality.

These characteristics may be important to a satisfying experience for example in a game where typed or spoken interaction between players is important, and/or where fast reactions (and hence low network lag) are important.

Other parameters characteristic of the user with respect to a specific game include but are not limited to: ranking within a ranking scheme of the multiplayer game; reputation within the reputation scheme of the multiplayer game; and multiplayer game type.

Ranking may have a different level of importance depending on the multiplayer game type; for example in a game of chess, mismatched rankings may reduce enjoyment for both players; meanwhile when assembling a group of cooperative players for a massively multiplayer on-line world, a notionally similar mismatch in rankings may have a less detrimental effect to enjoyment. Meanwhile, reputation may be separate to ranking, and may either be positive or negative; for example a user who has been reported for cheating or making offensive comments may have a negative rating, whilst a user who has given other players advice or help may have a positive rating. Reputation may also relate to how many hours a user has spent on-line, and/or how many other pairings they have previously made.

Other parameters characteristic of the user with respect to their interaction with a specific game include but are not limited to: user progression within the multiplayer game; indicators of in-game achievements credited to the user; and best or average scores for one or more activities within the multiplayer game.

User progression within the multiplayer game may also encompass user progression within a single-player component of the multiplayer game, as this may also indicate the user's skill within a game world and familiarisation with controls and gameplay mechanics, even if they have not played a multiplayer game before. User progression may be measured by metrics suitable to the game, such as distance covered, objects collected, quests completed, etc.

Indicators of in-game achievements are often referred to as 'trophies' and typically recognise particular milestones or behaviours identified by the game developer as being of interest. Some of these may also be indicative of play style; for example one trophy may recognise that a user has collected a predetermined number of objects, indicating that they enjoy a slow and detailed progression through a game, whilst another trophy may recognise that a user has killed enemies with high accuracy or high-speed, indicating a particular proficiency and/or a different gameplay style. Acquisition of these trophies, or a subset thereof, can thus be seen as indicative of a user's play style and/or particular competencies within a specific game.

Meanwhile, best or average scores for one or more activities within the multiplayer game can be seen as more direct benchmarks of user competency; for example in a multiplayer game, the best or average score for the number of enemies killed, or objects collected, may be indicative of the user's play style and/or abilities.

In an embodiment of the present invention, the entertainment device of the first player is adapted to simulate an artificial neural network, and input the parameter values for each of the first player and the second player into the artificial neural network. This simulation may be performed by the APU 20, or dedicated hardware such as a field programmable gate array (FPGA) or application-specific integrated circuit (ASIC).

Any suitable artificial neural network may be used. As a non-limiting example, the artificial neural network may use the well-known back-propagation algorithm. This algorithm provides a highly non-linear classification mechanism for learning associations between complex multidimensional inputs and potentially similarly complex multidimensional outputs.

The artificial neural network typically has an input row or layer of neurons, the number of which corresponds to the number of inputs presented to the artificial neural network, and an output row or layer of neurons, number of which corresponds to the number of outputs desired from the artificial neural network. In addition there is an intermediate or middle row or layer of neurons which connect to the input and output rows. During training, the back-propagation algorithm incrementally modifies nonlinear weighting functions within the neurons in each layer to transform the input values at the input layer into output values that are closer to target output values as a function of the error between the actual output values in the output layer and the target output values.

In an embodiment of the present invention, the selected parameter values for each of the first player and second player are presented as inputs to the input layer of the artificial neural network.

These inputs typically take the form of a list of parameter values than may be thought of as a vector. Typically individual parameter values are normalised to the range (0,1) for input to the artificial neural network.

Where one subset of selected parameter values is much larger than other subsets (for example, flags relating to the awarding of N trophies may represent a large proportion of all values in the input vector), such that potentially noise within the network on a large number of inputs may reduce its efficiency, or the subset of parameter values may initially dominate the responses of the neural network, this subset of parameter values may be multiplied by a predetermined but random N×M matrix, where N is the size of the subset of selected parameter values, and M is the desired number of inputs, to generate a replacement subset of values that is similarly orthogonal to the original subset but has few dimensions. This reduced subset of M values can then be substituted as parameter values for the larger original subset of N parameter values for input to the artificial neural network.

In any event, the parameter values may be input into the artificial neural network, and one or more output values may be obtained from one or more output neurons on the output row of the artificial neural network.

In an embodiment of the present invention, the or each output value is a pairing fitness value output from the artificial neural network, which the processor of the entertainment device may then subsequently use.

Hence, (in the case of an adequately trained artificial neural network), in response to input parameters relating to the first player and second player of the multiplayer application, the artificial neural network outputs one or more pairing fitness values.

In the case where the artificial neural network is configured to have a single neuron on the output layer, the value output by this neuron may represent an estimated overall satisfaction value for the pairing of the first player and the second player, for example on a satisfaction scale from 0 to 1. The satisfaction represented by this scale may be a linear or non-linear mapping.

In the case where the artificial neural network is configured to have two neurons on the upper layer, the respective output values of these neurons may represent an estimated satisfaction value of the first player and an estimated satisfaction value of the second player. Similar scaling for satisfaction may be employed.

The processor of the entertainment device is adapted to select whether or not to pair the first player and the second player within the multiplayer application, in dependence upon a criterion responsive to the or each pairing fitness value.

In an embodiment of the present invention, the criterion is that a first pairing fitness value meets a threshold value. For example where an overall satisfaction value for the pairing of the first player in the second player meets a predetermined threshold, an entertainment device proceeds to arrange the pairing. Meanwhile, where estimated satisfaction values are given separately for the first player in the second player, optionally both satisfaction values must meet a predetermined threshold (optionally different thresholds for each player), or only a satisfaction value for the first player must meet a predetermined threshold, optionally subject to the condition that the satisfaction value for the second player is not below a second predetermined threshold indicative of likely dissatisfaction.

Similarly, in an embodiment of the present invention, pairings are evaluated between the first player and a plurality of candidate second players, for example supplied by a server administering the multiplayer application. In this case, the criterion may be the highest pairing fitness value (or pair of values) found when evaluating each of the possible pairing candidates, subject to that pairing still being available once the evaluation is complete; if the candidate second player has subsequent legal off-line or been paired elsewhere, then the next highest pairing fitness value (or pair of values) that is available may be selected. Again, the above pairings may be subject to meeting predetermined thresholds of satisfaction or avoiding predetermined thresholds of dissatisfaction.

In an embodiment of the present invention, the artificial neural network is trained by providing it with inputs as described above, and pairing according to the neural network outputs and criteria as discussed above, and then providing feedback from the users about their satisfaction with the pairing. This may be done for example during so-called alpha or beta testing of the game by the developers, quality assurance testers and/or early adopters of the game. Alternatively or in addition such training may be undertaken, or subsequent training to refine an already trained neural network may be undertaken, during normal use of the game by end-users.

User satisfaction may be explicit, in the form of inputting a rating, or may be implicitly disclosed by such behaviours as duration of gameplay, a decision by the pair of users to play together a second time, any selection of positive inbuilt comments between users, the in-game purchasing of equipment (whether using real or in game money) indicative of user investment in the pairing, whether the users remain within a predetermined distance of each other within a virtual environment, whether they play cooperatively—for example by firing on the same enemy at the same time, and so on; individual examples of positive behaviour by the users is likely to be game specific and a matter of design choice.

The or each satisfaction value is then related to a corresponding pairing fitness value. For example, explicit ratings may be between 0 and 10, and these may directly be normalised to the range (0,1) used by the artificial neural network. Meanwhile other game play behaviour may be rated on different scales and may be combined using any suitable arithmetic and/or weightings to arrive at a single value that may be normalised to the range (0,1). Where a single overall pairing fitness value is required, then the values from the first and second player may be averaged. Whereas where respective pairing fitness values for the first and second player required, then the values from the first and second player may be used separately.

These values may be used directly as target values for the artificial neural network, or alternatively may be replaced by binary target value (for example '1' for satisfactory, and '0' for unsatisfactory) based on whether the value exceeds a predetermined satisfaction threshold.

Optionally, the binary target value may be used during early training of the neural network to achieve faster classification of satisfactory/unsatisfactory pairings, and use of target values across the range (0,1) may only be used subsequently to refine training of the neural network output(s).

In any event, the processor of the entertainment device trains the artificial neural network on the parameter values for each of the first player and second player as inputs to the artificial neural network and users the or each target value (whether ranged or binary) as the basis for comparison with the output of the artificial neural network to generate the corrective error value(s) then used to train the artificial neural network.

It will be appreciated that, as noted above, the artificial neural network may be initially trained by a pool of developers, quality testers or beta testers and the like, to create a generic neural network which nevertheless is capable of modelling subtle and potentially nonlinear interactions between parameters of a first and second user to predict whether they represent a satisfactory match.

However, it may equally be appreciated that individual users will have different capabilities, behaviours and preferences in terms of satisfaction, and so it will be beneficial for the artificial neural network to be trained on their individual satisfaction ratings.

Consequently, a neural network that has been trained so as to provide a baseline level of discrimination between first and second players may be provided with the game software and may be subsequently trained during gameplay with an individual user to learn associations between their input parameters and satisfaction levels when playing with other players.

Artificial neural networks can be controlled to increase or decrease their rate of learning; accordingly, the neural networks rate of learning may be comparatively high when the user first starts multiplayer gaming in order to quickly adapt to their preferences, before the rate of learning drops down to a slower rate of adaptation. As a refinement, the rate of learning may become comparatively high only after a predetermined number of multiplayer games have been played, to account for any difficulties and frustrations with a learning curve of the game by the user that may bias their satisfaction ratings in a manner which is independent of who they are playing against.

The above description has referred to an entertainment device such as the PlayStation 4® simulating the artificial neural network.

Figure 2:
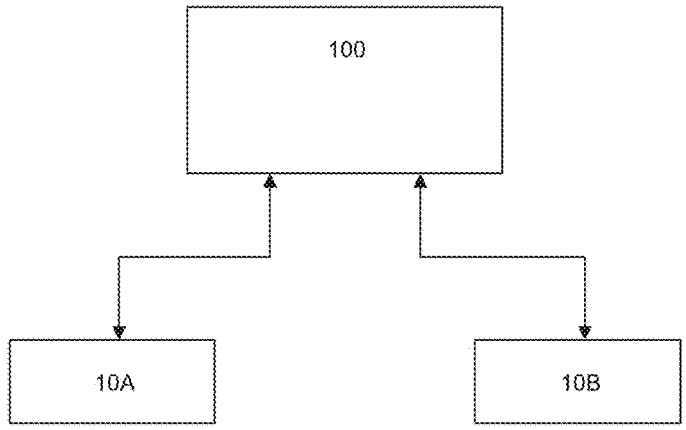
FIG. 2 is a schematic diagram of a server and client entertainment devices in accordance with embodiments of the present invention.

However referring now to FIG. 2, in an alternative embodiment a server 100 that administers the multiplayer game or is in communication with such a server simulates the artificial neural network and decides on whether or not to pair two players. In this case, optionally a single artificial neural network is used to compare first and second players, but preferably separate artificial neural networks are stored for respective players each artificial neural network and learn to model the individual satisfaction of a respective player. It will be appreciated that an artificial neural network can be easily stored as a collection of neuron weighting and connection values, and can be associated with a user ID for appropriate recall and use.

Hence this embodiment operates in a manner similar to the previous embodiment based on the entertainment device except that either both sets of parameter values for the first and second players are received via network connections from the entertainment devices 10A, 10B of the two players, or both sets are stored at the server, or a combination of the two.

It will also be appreciated that the server may run the respective neural networks are associated with first and second players, so that satisfaction values for each player with respect to their own neural networks may be evaluated. In this case the previously described criterion for selecting whether to pair the players based on estimated satisfaction levels may be based on averages or individual output values from the two neural networks, rather than from individual output nodes of one neural network.

Again the server may compare the first player against a plurality of candidate second players, and select the pairing with the highest estimated satisfaction that remains available after the comparison is complete.

In any event, once a selection is been made, the server may then initiate the actual pairing of the players within the game, according to the individual requirements of the game.

Figure 3:
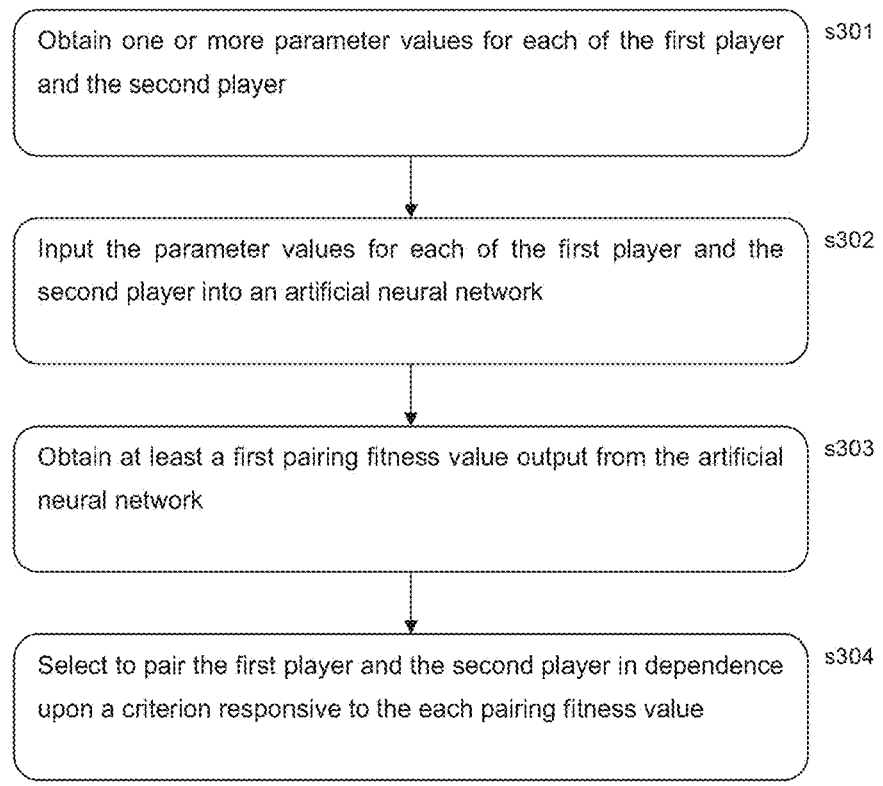
FIG. 3 is a flow diagram of a method of evaluating a pairing in accordance with embodiments of the present invention.

Referring now also to FIG. 3, in a summary embodiment of the present invention, a method of evaluating a pairing between a first player and a second player of a multiplayer application comprises:

in a first step s301, obtaining one or more parameter values for each of the first player and the second player;
in a second step s302, inputting the parameter values for each of the first player and the second player into an artificial neural network;
in a third step s303, obtaining at least a first pairing fitness value output from the artificial neural network; and
in a fourth step s304, selecting to pair the first player and the second player in dependence upon a criterion responsive to the each pairing fitness value.

In an instance of this summary embodiment, the method comprises, in the event of a selection to pair the first player and the second player in the multiplayer application, obtaining at least a first satisfaction value from at least one of the first player and the second player, relating the or each satisfaction value to a corresponding pairing fitness value, the or each resulting airing fitness value being a target value, and training the artificial neural network on the parameter values for each of the first player and the second player as inputs to the artificial neural network and the or each target value as one or more outputs of the artificial neural network.

In an instance of this summary embodiment, the first pairing fitness value corresponds to an estimated overall satisfaction value for the pairing of the first player and the second player.

In an instance of this summary embodiment, a first pairing fitness value corresponds to an estimated satisfaction value of the first player, and a second pairing fitness value corresponds to an estimated satisfaction value of the second player, for the pairing of the first player in the second player.

In an instance of this summary embodiment, the parameter values are one or more selected from the list consisting of language; country; and on-line connection quality.

In an instance of this summary embodiment, the parameter values are one or more selected from the list consisting of: ranking within a ranking scheme of the multiplayer application; reputation within the reputation scheme of the multiplayer application; and multiplayer application type.

In an instance of this summary embodiment, the parameter values are one or more selected from the list consisting of: user progression within the multiplayer application; indicators of in-application achievements credited to the user; and best or average scores for one or more activities within the multiplayer application.

In an instance of this summary embodiment, the criterion is that a first pairing fitness value meets a threshold value.

In an instance of this summary embodiment, pairings are evaluated between the first player and plural second players, and the criterion is selection of the pairing with the highest pairing fitness value that remains available after evaluation is complete.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence, in a summary embodiment of the present invention, an entertainment device 10 (such as the Sony® PlayStation 4®)) of a first player, comprises memory means (such as RAM 22) adapted to obtain one or more parameter values of the first player; network means (such as Ethernet® 32 or Wi-Fi® 34) adapted to obtain one or more parameter values of the second player; processing means (such as APU 20 or CPU 20A operating under suitable software instruction) adapted to simulate an artificial neural network and input the parameter values for each of the first player and the second player into the artificial neural network; the processing means being adapted to obtain at least a first pairing fitness value output from the artificial neural network; and the processing means being adapted to select whether or not to pair the first player and the second player in dependence upon a criterion responsive to the pairing fitness value.

In an instance of this summary embodiment, in the event of a selection to pair the first player and the second player in the multiplayer application, the processing means is adapted to obtain a satisfaction value from at least one of the first player and the second player; the processing means is adapted to relate the or each satisfaction value to a corresponding pairing fitness value, the or each resulting pairing fitness value being a target value; and the processing means is adapted to train the artificial neural network on the parameter values for each of the first player and the second player as inputs to the artificial neural network and the or each target value as one or more outputs of the artificial neural network.

Similarly, in a summary embodiment of the present invention, a server 100 for a multi-player application comprises network means (such as Ethernet®, not shown) adapted to obtain one or more parameter values for each of a first player and a second player; processing means (such as one or more server CPUs, not shown) adapted to simulate an artificial neural network and input the parameter values for each of the first player and the second player into the artificial neural network; the processing means being adapted to obtain at least a first pairing fitness value output from the artificial neural network; and the processing means being adapted to select whether or not to pair the first player and the second player in dependence upon a criterion responsive to the or each pairing fitness value.

In instance of this summary embodiment, in the event of a selection to pair the first player and the second player in the multiplayer application, the processing means is adapted to obtain a satisfaction value from at least one of the first player and the second player; the processing means is adapted to relate the or each satisfaction value to a corresponding pairing fitness value, the or each resulting pairing fitness value being a target value; and the processing means is adapted to train the artificial neural network on the parameter values for each of the first player and the second player as inputs to the artificial neural network and the or each target value as one or more outputs of the artificial neural network.

It will be understood that numerous modifications and variations of the present disclosure are possible in light of the above teachings. It is therefore to be understood that within the scope of the appended claims, the invention may be practiced otherwise than as specifically described herein.

The invention claimed is:

1. A method of evaluating a pairing between a first player and a second player of a multiplayer application, comprising the steps of:
    obtaining one or more parameter values for each of the first player and the second player;
    inputting the parameter values for each of the first player and the second player into an artificial neural network;
    obtaining at least a first pairing fitness value output from the artificial neural network;
    selecting to pair the first player and the second player in dependence upon a criterion responsive to the or each pairing fitness value, and in the event of a selection to pair the first player and the second player in the multiplayer application:
    obtaining at least a first satisfaction value from at least one of the first player and the second player;
    relating the or each satisfaction value to a corresponding pairing fitness value, the or each resulting pairing fitness value being a target value; and
    training the artificial neural network on the parameter values for each of the first player and the second player as inputs to the artificial neural network and the or each target value as one or more outputs of the artificial neural network.

2. A method of evaluating a pairing according to claim 1, in which the first pairing fitness value corresponds to an estimated overall satisfaction value for the pairing of the first player and the second player.

3. A method of evaluating a pairing according to claim 1, in which a first pairing fitness value corresponds to an estimated satisfaction value of the first player, and a second pairing fitness value corresponds to an estimated satisfaction value of the second player, for the pairing of the first player with the second player.

4. A method of evaluating a pairing according to claim 1, in which the parameter values are one or more selected from the list consisting of:
    i. language;
    ii. country; and
    iii. on-line connection quality.

5. A method of evaluating a pairing according to claim 1, in which the parameter values are one or more selected from the list consisting of:
    i. ranking within a ranking scheme of the multiplayer application;
    ii. reputation within the reputation scheme of the multiplayer application; and
    iii. multiplayer application type.

6. A method of evaluating a pairing according to claim 1, in which the parameter values are one or more selected from the list consisting of:
    i. user progression within the multiplayer application;
    ii. indicators of in-application achievements credited to the user; and
    iii. best or average scores for one or more activities within the multiplayer application.

7. A method of evaluating a pairing according to claim 1, in which the criterion is that a first pairing fitness value meets a threshold value.

8. A method of evaluating a pairing according to claim 1, in which:
    pairings are evaluated between the first player and plural second players, and the criterion is selection of the pairing with the highest pairing fitness value that remains available after evaluation is complete.

9. A method of evaluating a pairing according to claim 1, in which respective artificial neural networks are associated with respective players of the multiplayer application.

10. A non-transitory, computer readable medium having computer executable instructions adapted to cause a computer system to perform a method of evaluating a pairing between a first player and a second player of a multiplayer application, comprising the steps of:
    obtaining one or more parameter values for each of the first player and the second player;
    inputting the parameter values for each of the first player and the second player into an artificial neural network;
    obtaining at least a first pairing fitness value output from the artificial neural network;
    selecting to pair the first player and the second player in dependence upon a criterion responsive to the or each pairing fitness value, and in the event of a selection to pair the first player and the second player in the multiplayer application:
    obtaining at least a first satisfaction value from at least one of the first player and the second player;

relating the or each satisfaction value to a corresponding pairing fitness value, the or each resulting pairing fitness value being a target value; and training the artificial neural network on the parameter values for each of the first player and the second player as inputs to the artificial neural network and the or each target value as one or more outputs of the artificial neural network.

11. An entertainment device of a first player, comprising:

memory means adapted to obtain one or more parameter values of the first player;

network means adapted to obtain one or more parameter values of the second player;

processing means adapted to simulate an artificial neural network and input the parameter values for each of the first player and the second player into the artificial neural network;

the processing means being adapted to obtain at least a first pairing fitness value output from the artificial neural network; and the processing means being adapted to select whether or not to pair the first player and the second player in dependence upon a criterion responsive to the pairing fitness value, wherein, in the event of a selection to pair the first player and the second player in the multiplayer application:

the processing means is adapted to obtain a satisfaction value from at least one of the first player and the second player;

the processing means is adapted to relate the or each satisfaction value to a corresponding pairing fitness value, the or each resulting pairing fitness value being a target value; and the processing means is adapted to train the artificial neural network on the parameter values for each of the first player and the second player as inputs to the artificial neural network and the or each target value as one or more outputs of the artificial neural network.

12. A server for a multi-player application, comprising:

network means adapted to obtain one or more parameter values for each of a first player and a second player;

processing means adapted to simulate an artificial neural network and input the parameter values for each of the first player and the second player into the artificial neural network;

the processing means being adapted to obtain at least a first pairing fitness value output from the artificial neural network;

the processing means being adapted to select whether or not to pair the first player and the second player in dependence upon a criterion responsive to the or each pairing fitness value, wherein, in the event of a selection to pair the first player and the second player in the multiplayer application:

the processing means is adapted to obtain a satisfaction value from at least one of the first player and the second player;

the processing means is adapted to relate the or each satisfaction value to a corresponding pairing fitness value, the or each resulting pairing fitness value being a target value; and the processing means is adapted to train the artificial neural network on the parameter values for each of the first player and the second player as inputs to the artificial neural network and the or each target value as one or more outputs of the artificial neural network.

* * * * *